(12) United States Patent
Yasuda et al.

(10) Patent No.: US 7,690,730 B2
(45) Date of Patent: Apr. 6, 2010

(54) SEAT SUPPORT STRUCTURE

(75) Inventors: Kazuhiro Yasuda, Saitama (JP);
Hideaki Suzuki, Saitama (JP); Seiji Hanafusa, Saitama (JP); Masahiro Inoue, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 11/790,258

(22) Filed: Apr. 24, 2007

(65) Prior Publication Data
US 2007/0257535 A1 Nov. 8, 2007

(30) Foreign Application Priority Data
Apr. 27, 2006 (JP) .............................. 2006-123497

(51) Int. Cl.
*A47C 7/00* (2006.01)
(52) U.S. Cl. .............................. 297/440.22; 297/195.11; 297/214
(58) Field of Classification Search ............ 297/195.11, 297/195.1, 214, 440.22; 24/453, 297; 403/326, 403/329, 282, 276
See application file for complete search history.

(56) References Cited
U.S. PATENT DOCUMENTS

| | | | | |
|---|---|---|---|---|
| 3,063,114 A | * | 11/1962 | Jean .............................. 24/297 |
| 3,655,226 A | * | 4/1972 | Cowan ........................ 403/165 |
| 3,659,320 A | * | 5/1972 | Meyer .......................... 24/297 |
| 4,471,496 A | * | 9/1984 | Gardner et al. .................. 2/209 |
| 4,517,711 A | * | 5/1985 | Tanaka ......................... 24/453 |
| D293,880 S | * | 1/1988 | Takahashi ..................... D8/354 |
| 5,857,244 A | * | 1/1999 | Edwards et al. ................ 24/297 |
| 5,882,081 A | * | 3/1999 | Earl, Jr. .................. 297/423.11 |
| 5,899,824 A | * | 5/1999 | Kurtz et al. .................. 473/578 |
| 6,024,496 A | * | 2/2000 | Shy .............................. 384/279 |
| 6,070,896 A | * | 6/2000 | Saiki ........................ 280/288.4 |
| 6,594,870 B1 | * | 7/2003 | Lambrecht et al. ............. 24/297 |
| 6,749,358 B2 | * | 6/2004 | Balsells ....................... 403/316 |
| 6,860,551 B1 | * | 3/2005 | Chi ............................. 297/200 |
| 7,059,674 B2 | * | 6/2006 | Garland et al. .............. 297/204 |
| 7,192,085 B2 | * | 3/2007 | Lee .......................... 297/195.1 |
| 7,226,233 B2 | * | 6/2007 | SuBenbach et al. ......... 403/143 |

(Continued)

FOREIGN PATENT DOCUMENTS

EP 0 726 196 A1 8/1996

(Continued)

*Primary Examiner*—David Dunn
*Assistant Examiner*—James Alex
(74) *Attorney, Agent, or Firm*—Birch, Stewart, Kolasch & Birch, LLP

(57) ABSTRACT

A seat support structure for facilitating assembly of a frame support member. The seat support structure includes a seat support portion mounted on a seat rail of a vehicle, the seat support portion having an opening portion; a mount rubber having an engaging groove portion on an outer peripheral portion thereof, an insertion portion arranged closer to a distal end side than the engaging groove portion, and a through hole penetrating through the mount rubber. Upon mounting the seat, the insertion portion of the mount rubber is inserted into the opening portion of the seat support portion, the portion of the seat to be supported is inserted into the through hole, and the mount rubber is moved in the radial direction in an inside of the opening portion, and a portion of a groove wall of the engaging groove portion is brought into pressure contact with the opening portion.

20 Claims, 9 Drawing Sheets

U.S. PATENT DOCUMENTS

| | | | |
|---|---|---|---|
| 2001/0051071 A1* | 12/2001 | Serre | 403/326 |
| 2004/0052579 A1* | 3/2004 | Draggoo et al. | 403/326 |
| 2005/0150087 A1* | 7/2005 | Lydan | 24/297 |
| 2007/0163089 A1* | 7/2007 | Sugiura et al. | 24/297 |
| 2007/0234527 A1* | 10/2007 | Aoyama | 24/297 |
| 2007/0289107 A1* | 12/2007 | Alhof et al. | 24/297 |

FOREIGN PATENT DOCUMENTS

| | | |
|---|---|---|
| EP | 1 437 293 A2 | 7/2004 |
| EP | 1 486 409 A2 | 12/2004 |
| EP | 1 754 657 A2 | 2/2007 |
| JP | 63-71485 A | 3/1988 |

\* cited by examiner

SEAT SUPPORT STRUCTURE

CROSS-REFERENCE TO RELATED APPLICATION

The present application claims priority under 35 U.S.C. §119 to Japanese Patent Application No. 2006-123497, filed Apr. 27, 2006, the entire contents of which are hereby incorporated by reference.

BACKGROUND OF THE INVENTION

1. Field of the Invention

The present invention relates to a seat support structure of an ATV (All Terrain Vehicle) vehicle which supports a seat by engaging an engaging groove portion formed on an outer peripheral portion of a mount rubber with an opening portion of a seat support portion mounted on a seat rail and by inserting a portion to be supported of the seat into a through hole formed in a mount rubber.

2. Description of Background Art

Conventionally, there has been known a seat support structure of an ATV or the like which supports a seat by engaging annular groove portions of mount rubbers with opening portions of a pair of seat support portions formed on seat rails and by inserting guide pins of a seat into through holes formed in the mount rubbers.

In this type of seat support structure, a diameter of the annular groove portions of the mount rubbers is set equal to a diameter of the opening portions of the seat support portions, and a diameter of the insertion portions closer to distal end sides than the annular groove portions is set larger than the diameter of the opening portion of the seat support portions. The annular groove portions are engaged with the opening portions by inserting the distal end sides of the mount rubbers into the opening portions of the seat support portions, and the guide pins formed on the seat are made to penetrate through holes formed in the mount rubber thus supporting the seat (see patent JP-A-63-71485).

However, in the conventional seat support structure, when there exists an error in manufacturing between a distance of the guide pins of the seat and a distance of the mount rubbers, the guide pins and the mount rubbers are not aligned with each other thus making the assembling of the seat to the mount rubbers difficult.

Further, the diameter of the distal end portions of the mount rubbers is larger than the diameter of the opening portions of the seat support portions and hence, the insertion of the mount rubbers requires a force. At the same time, the diameter of the annular groove portions is equal to the diameter of the opening portions of the seat support portions and hence, the fitting of the annular groove portions also requires a force thus making an assembling operation of the mount rubbers difficult.

The invention has been made in view of the above-mentioned circumstances and it is an object of the invention to provide a seat support structure which can facilitate a seat mounting operation and also can facilitate an assembling operation of mount rubbers.

SUMMARY AND OBJECTS OF THE INVENTION

To achieve the above-mentioned object, the invention provides a seat support structure which supports a seat by engaging an engaging groove portion formed on an outer peripheral portion of a mount rubber in an opening portion of a seat support portion mounted on a seat rail of a vehicle and by inserting a portion to be supported of the seat into a through hole formed in a mount rubber. At a seat mounting position where an insertion portion of the mount rubber arranged closer to a distal end side than the engaging groove portion is inserted into the opening portion of the seat support portion and the portion to be supported of the seat is inserted into the through hole formed in the mount rubber, the mount rubber is moved in the radial direction in the inside of the opening portion. In addition, a portion of a groove wall of the engaging groove portion is brought into pressure contact with the opening portion.

According to the invention, at a seat mounting position at which the insertion portion of the mount rubber arranged closer to the distal end side than the engaging groove portion is inserted into the opening portion of the seat support portion and the portion to be supported of the seat is inserted into the through hole formed in the mount rubber, the mount rubber is moved in the radial direction in the inside of the opening portion and a portion of a groove wall of the engaging groove portion is brought into pressure contact with the opening portion. Accordingly, even when there exists an error in manufacturing between positions of the portion to be supported of the seat and the position of the mount rubber, the seat can be easily assembled to the mount rubbers. Hence, the seat mounting operation can be easily performed and, at the same time, the mount rubber is brought into pressure contact with the opening portion thus supporting the seat without a play. Further, the mount rubber is arranged to be movable in the radial direction in the inside of the opening portion of the seat support portion and hence, the assembling operation of the mount rubber can be facilitated.

In the above-mentioned constitution, a diameter of the engaging groove portion may preferably be set smaller than a diameter of the opening portion of the seat support portion. Due to such a constitution, it is possible to ensure a wide degree of freedom in movement of the mount rubber in the inside of the opening portion of the seat support portion. As a result, the assembling operation of the mount rubber can be further facilitated.

In the above-mentioned constitution, a diameter of a body portion of the mount rubber may preferably be set larger than a diameter of the insertion portion. Due to such a constitution, when the mount rubber is inserted into the opening portion of the seat support portion, a body portion of the mount rubber is supported on the seat support portion without penetrating the opening portion. As a result, the removal of the mount rubber can be surely prevented.

Further, in the above-mentioned constitution, a diameter of the insertion portion of the mount rubber may preferably be set larger than a diameter of the opening portion of the seat support portion. Due to such a constitution, the mount rubber is hardly removed from the opening portion.

Further, in the above-mentioned constitution, the portion to be supported of the seat may be a pin which projects from a seat bottom plate. Due to such a constitution, the pin which projects from the seat bottom plate is inserted into the through hole formed in the mount rubber. As a result, when the seat receives a weight and is slid in either left or right direction of the vehicle, the mount rubber can receive the weight of the seat by way of the pin.

In the above-mentioned constitution, the pin may preferably form an inclined portion on either one of a vehicle-body-outer-side or a vehicle-body-inner-side thereof. Due to such a constitution, the tapered pin can be easily inserted into the through hole formed in the mount rubber. At the same time, along with the continued insertion of the pin, the inclined portion is brought into contact with either one of a vehicle-body-outer-side or a vehicle-body-inner-side of the through hole formed in the mount rubber so as to move the mount rubber to a position at which a portion of the groove wall of the engaging groove portion is brought into pressure contact with a vehicle-body-outer-side opening wall or a vehicle-body-inner-side opening wall of the opening portion. Accordingly, the seat mounting operation is facilitated.

Further, in the above-mentioned constitution, a distal end of the pin may preferably not penetrate the through hole formed in the mount rubber. Due to such a constitution, it is possible to easily insert the pin deeply into the mount rubber and, at the same time, the pin is positioned in the inside of the body portion of the mount rubber. Therefore, when the seat receives a weight and is slid, the mount rubber can receive the weight due to the deflection of body portion of the mount rubber.

Further, in the above-mentioned constitution, the seat may preferably include a positioning member which extends from a seat bottom plate and is positioned in the vicinity of an inner surface of the seat rail. Due to such a constitution, the positioning member functions as a guide member which guides the seat to the mounting position and a lateral displacement preventing member for preventing the lateral displacement of the seat. Further, in removing the seat, the positioning member is used as a leg of the seat thus enabling the self-standing of the seat thus preventing flaws or the like on a surface skin of the seat which occur when the seat is placed as a single body. The positioning member may preferably extend below the seat bottom plate. Due to such a constitution, in mounting the seat, the positioning member firstly passes through the inside of the seat rail and hence, the seat can be surely guided to the mounting position.

Further, in the above-mentioned constitution, the portions to be supported in pairs may preferably be arranged on the seat in a spaced-apart manner, the opening portions in the same number of pairs as the portions to be supported may preferably be arranged on the seat support portion in a spaced-apart manner, a distance between the portions to be supported in pairs may preferably be made different from a distance between the opening portions in pairs, and the mount rubbers may preferably be formed with a distance equal to the distance between the respective through holes formed in the mount rubbers in a state that the mount rubbers are moved to a distance between the portions to be supported and portions of the engaging groove portions are brought into pressure contact with the opening portions respectively. Due to such a constitution, the distance between the portions to be supported in pairs of the seat is made different from the distance between the opening portions in pairs, and the mount rubbers are formed with the distance equal to the distance between the respective through holes formed in the mount rubbers in a state that the mount rubbers are moved to the distance between the portions to be supported and portions of the engaging groove portions are brought into pressure contact with the opening portions respectively. Accordingly, when the portions to be supported are inserted into the mount rubbers which are respectively arranged in the opening portions in pairs, the respective mount rubbers can be held in a state that the portions of engaging groove portions are respectively brought into contact with the respective opening portion and hence, it is possible to surely support the seat without a play.

EFFECTS OF THE INVENTION

According to the invention, at the seat mounting position at which the insertion portion of the mount rubber arranged closer to the distal end side than the engaging groove portion is inserted into the opening portion of the seat support portion and the portion of the seat to be supported is inserted into the through hole formed in the mount rubber, the mount rubber is moved in the radial direction in the inside of the opening portion and a portion of a groove wall of the engaging groove portion is brought into pressure contact with the opening portion. Accordingly, the seat mounting operation can be easily performed and, at the same time, the seat can be supported without a play. Further, the mount rubber is arranged to be movable in the radial direction in the inside of the opening portion of the seat support portion. Hence, the assembling operation of the mount rubber can be facilitated.

Further, since the diameter of the engaging groove portion is set smaller than the diameter of the opening portion of the seat support portion, it is possible to ensure a wide degree of freedom in movement of the mount rubber in the inside of the opening portion of the seat support portion whereby the assembling operation of the mount rubber can be further facilitated.

Further, since the diameter of a body portion of the mount rubber is set larger than the diameter of the insertion portion, the body portion of the mount rubber does not pass through the opening portion whereby the removal of the mount rubber can be surely prevented.

Further, the diameter of the insertion portion of the mount rubber is set larger than the diameter of the opening portion of the seat support portion, the mount rubber is difficult to remove from the opening portion.

Further, since the portion of the seat to be supported is the pin which projects from a seat bottom plate, when the seat is slid in either left or right direction of the vehicle, the mount rubber can receive the weight of the seat by way of the pin.

Further, since the pin forms the inclined portion on either one of the vehicle-body-outer-side or the vehicle-body-inner-side thereof, the pin can be easily inserted into the through hole formed in the mount rubber thus facilitating the seat mounting operation.

Further, since the distal end of the pin does not penetrate the through hole formed in the mount rubber, it is possible to easily insert the pin deeply into the mount rubber. At the same time, the pin is positioned in the inside of the body portion of the mount rubber, whereby when the seat receives a weight and is slid, the mount rubber can receive the weight due to the deflection of body portion of the mount rubber.

Further, the seat includes a positioning member which extends from the seat bottom plate and is positioned in the vicinity of the inner surface of the seat rail, the positioning member functions as the guide member which guides the seat to the mounting position and the lateral displacement preventing member for preventing the lateral displacement of the seat. Further, in removing the seat, the positioning member is used as the leg of the seat thus enabling the self-standing of the seat thus preventing flaws on the surface skin of the seat. In this case, by extending the positioning member below the seat bottom plate, in mounting the seat, the positioning member firstly passes through the inside of the seat rail and hence, the seat can be surely guided to the mounting position.

Further, the distance between portions to be supported in pairs of the seat is made different from the distance between the opening portions in pairs, and the mount rubbers are formed with the distance equal to the distance between the respective through holes formed in the mount rubbers in a state that the mount rubbers are moved to the distance between the portions of the seat to be supported and portions of the engaging groove portions are brought into pressure contact with the opening portions respectively. Accordingly, when the portions of the seat to be supported in pairs are inserted into the mount rubbers which are respectively arranged in the opening portions in pairs, the respective mount rubbers can be held in a state that the portions of engaging groove portions are respectively brought into pressure contact with the respective opening portion and hence, it is possible to surely support the seat without a play.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
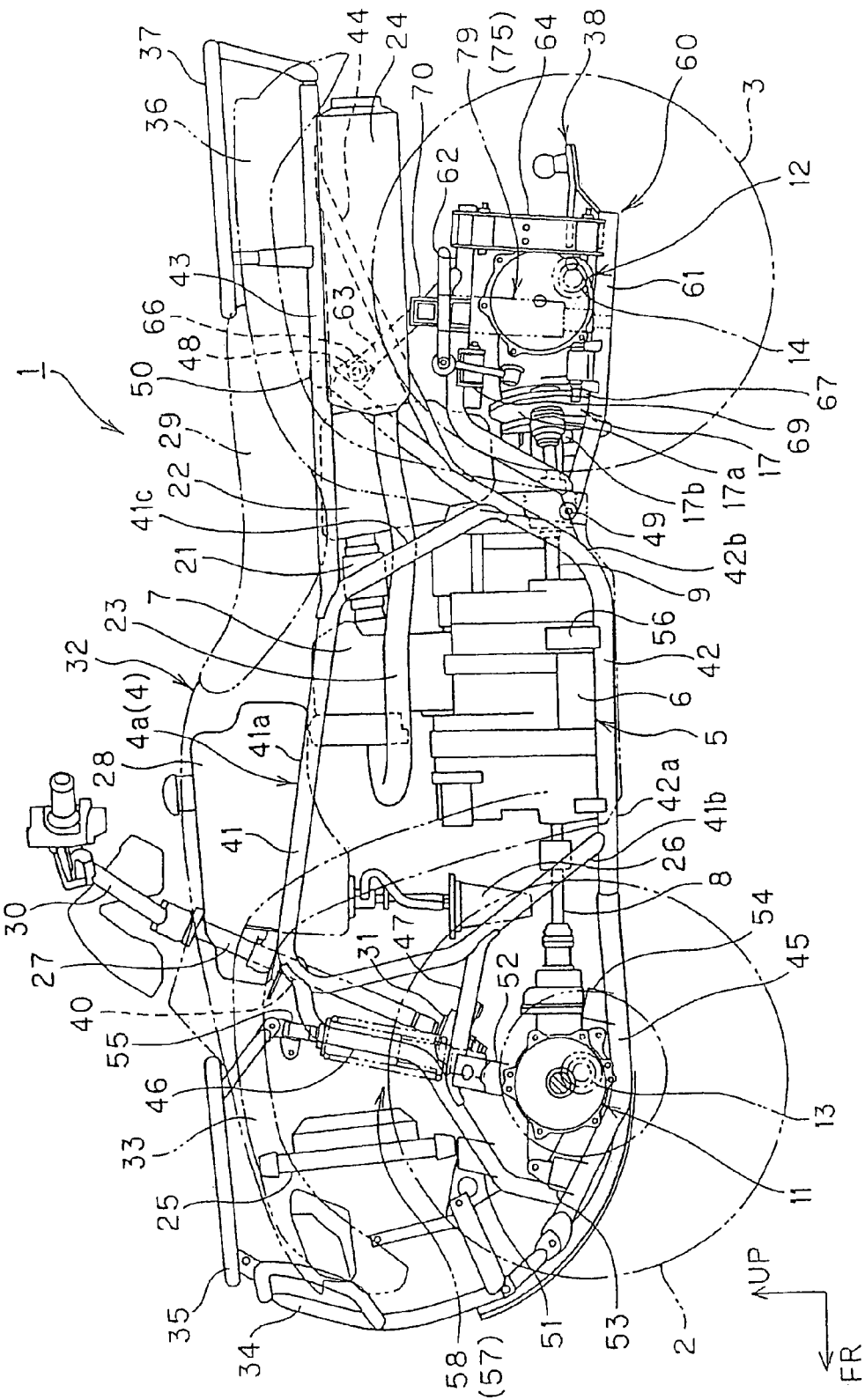
FIG. 1 is a side view showing the whole constitution of a saddle-type vehicle according to an embodiment of the invention.

Hereinafter, one embodiment of the invention is explained in conjunction with attached drawings. Here, in the explanation, the description of the directions such as the front direction, the rear direction, the left direction and the right direction is made with respect to the vehicle body. Further, in the drawing, an arrow FR indicates the front side of the vehicle body, an arrow LH indicates the left side of the vehicle body, and an arrow UP indicates the upper side of the vehicle body respectively.

Figure 2:
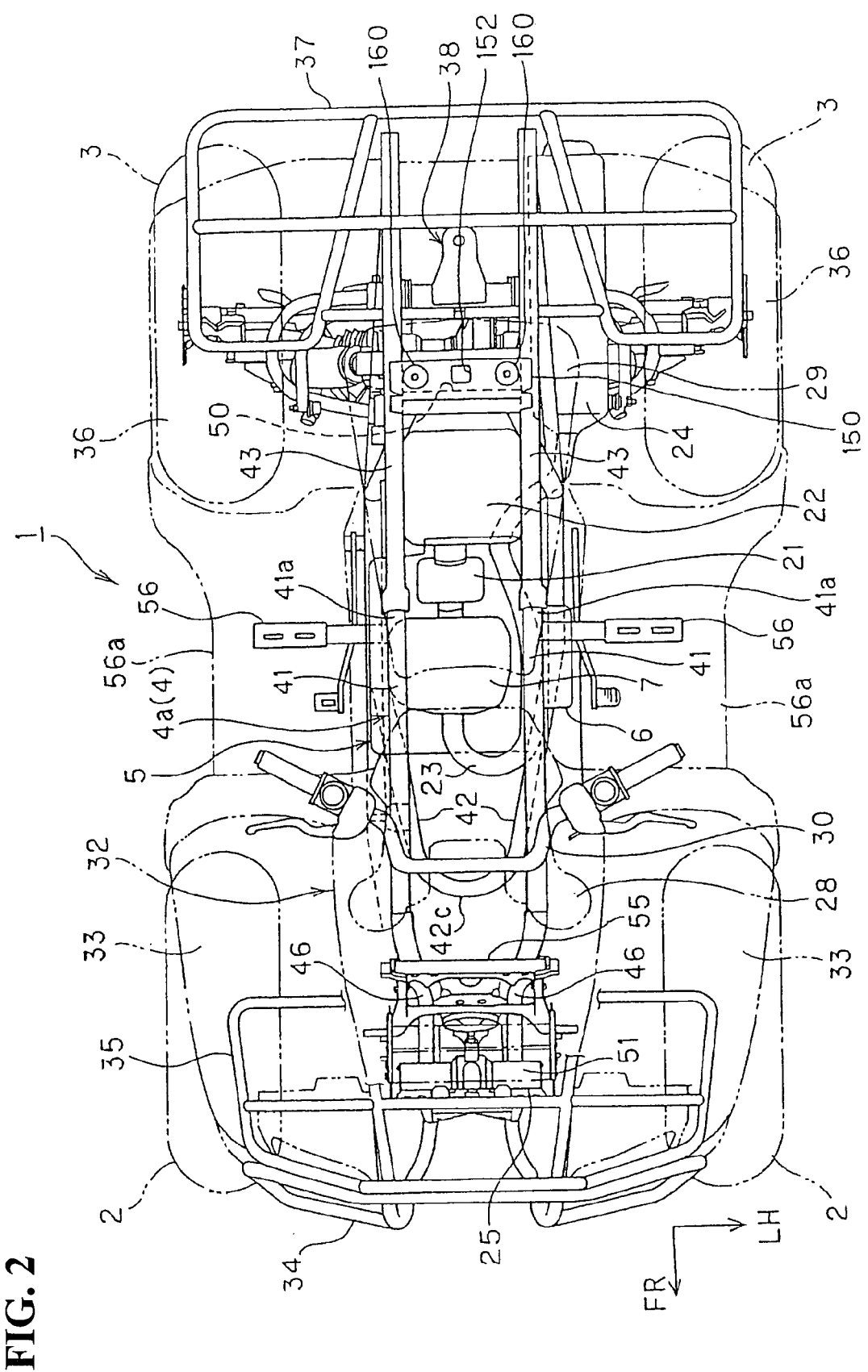
FIG. 2 is a top plan view of the saddle-type vehicle.

FIG. 1 is a side view of a saddle-type vehicle according to an embodiment of the invention and FIG. 2 is a top plan view. The saddle-type vehicle 1 is a four-wheeled vehicle which is classified into an ATV (All Terrain Vehicle) vehicle (rough-terrain traveling vehicle) and is a vehicle suitable for movement such as agriculture, stock farming, hunting, security monitoring or leisure. The vehicle includes left and right front wheels 2 and rear wheels 3, which are low-pressure balloon tire being relatively large in diameter at the front and rear of the vehicle body which is configured to be compact and light weight, and having a large minimum ground clearance for enhancing traveling performance mainly on the rough terrain.

The saddle-type vehicle 1 includes, as shown in FIG. 1, a vehicle body frame 4, wherein left and right front wheels 2 are suspended on a front portion of the vehicle body frame 4 by way of front suspensions 57 of an independent suspending type (double wishbone type) and the left and right rear wheels 3 are suspended on a rear portion of the vehicle body frame 4 also by way of rear suspensions 75 of the same independent suspending type (double wishbone type).

An engine 5 which constitutes a prime mover of the saddle-type vehicle 1 is mounted on a substantially center portion of the vehicle body frame 4. The engine 5 is, for example, a water-cooled single-cylinder engine, and is arranged in a so-called vertical layout with the axis of rotation of a crankshaft oriented to extend along the longitudinal direction of the vehicle, wherein the engine includes a crankcase 6 which pivotally supports the crankshaft or the like and a cylinder portion 7 which is connected to the crankcase 6. The crankcase 6 also serves as a transmission case which houses a transmission, and propeller shafts 8, 9 for the front wheel and the rear wheel are connected with the transmission in the inside of the crankcase 6 are led out from the crankcase 6 frontwardly and rearwardly respectively.

The respective propeller shafts 8, 9 are, below a front portion and a rear portion of the vehicle body frame 4, connected to the front wheels 2 and the rear wheels 3 by way of front and rear final gear cases 11, 12 and drive shafts 13, 14 which extend leftwardly and rightwardly from the gear cases 11, 12 so as to be capable of transmitting the power to the front wheel 2 and the rear wheel 3. The rotational power from the engine 5 is outputted to the respective propeller shafts 8, 9 by way of the transmission housed in the inside of the crankcase 6, and then, is transmitted to the front wheels 2 and rear wheels 3 by way of the respective final gear cases 11, 12 and drive shafts 13, 14 and the like. Here, a differential gear mechanism (a differential mechanism) is incorporated in the final gear case 11 and the difference in rotation between the left and right front wheels 2, 2 can be absorbed.

As shown in FIG. 1 and FIG. 2, a throttle body 21 is connected to the rear portion of a cylinder portion 7 of the engine 5, an air cleaner case 22 is connected to the rear portion of the throttle body 21, and these parts constitute an intake system of the engine 5. Further, an exhaust pipe 23 is connected to the front portion of the cylinder portion 7 of the engine 5. The exhaust pipe 23 extends toward a front side of the cylinder portion 7, is bent to the left and is folded back rearwardly. Then, the exhaust pipe 23 extends rearwardly along a left side of the cylinder portion 7 and, thereafter, is connected to a silencer 24 arranged on a rear portion of the vehicle body, and these parts constitute an exhaust system of the engine 5. Here, in FIG. 1, a fuel pump 26 for feeding fuel under pressure to an injector is arranged in the throttle body 21.

In the widthwise center portion of the upper portion of the vehicle body of the saddle-type vehicle 1, a steering shaft 27, a fuel tank 28 and a saddle-type seat 29 are respectively arranged in this order from a front side. A handle 30 of a bar-shape positioned at an obliquely upper front position of the fuel tank 28 is mounted on an upper end portion of the steering shaft 27. A front wheel steering mechanism 31 is connected to a lower end portion of the steering shaft 27. A radiator 25 for cooling the engine is arranged at a front side of a lower portion of the steering shaft 27.

On a front portion of the vehicle body frame 4, a resin-made vehicle body cover 32 which covers a front portion of the vehicle body including a fuel tank 28 from above, a resin-made front fender 33 which covers both front wheels 2 from above and a rear side, and a front protector 34 and a front carrier 35 mainly made of a steel material are mounted. Further, on a rear portion of the vehicle body frame 4, a resin-made rear fender 36 which covers both rear wheels 3 from above and a front side, and a rear carrier 37 mainly made of a steel material are mounted. A trailer hitch 38 is mounted on a rear end portion of a lower portion of vehicle body frame 4.

The vehicle body frame 4 includes frame bodies 4a which extend in the longitudinal direction of the vehicle body, and a sub frame 60 which is connected to rear portions of the frame bodies 4a. The frame bodies 4a are formed by joining a plurality of kinds of steel materials by welding or the like and a pair of left and right closed loop structural bodies are formed mainly of left and right upper pipes 41 and lower pipes 42. By joining these closed loop structural bodies by way of a plurality of cross members, the box structure which is elongated in the longitudinal direction is formed on a vehicle-width center portion.

The upper pipe 41 is, as shown in FIG. 1, integrally formed of an upper inclined portion 41a which extends obliquely and downwardly from the steering support portion 40 which supports the steering shaft 27, a front inclined portion 41b which extends obliquely and downwardly from a front end portion of the upper inclined portion 41a while making an acute angle with respect to the front end portion of the upper inclined portion 41a, and a rear inclined portion 41c which extends obliquely and downwardly from a rear end portion of the upper inclined portion 41a while making an obtuse angle with respect to the rear end portion of the upper inclined portion 41a, by applying bending forming to one steep pipe.

Further, the lower pipe 42 includes a lower horizontal portion 42a which is connected to a lower end of the front inclined portion 41b of the upper pipe 41 and extends approximately horizontally in the longitudinal direction of the vehicle body, and a rear inclined portion 42b which extends obliquely and upwardly from a rear end portion of the lower horizontal portion 42a while making an obtuse angle with respect to the rear end portion of the lower horizontal portion 42a and has a lower end of the rear inclined portion 41c of the upper pipe 41 connected to a vertically intermediate portion thereof, wherein these parts are integrally formed by applying bending forming to one steep pipe. The left and right lower pipes 42 are, as shown in FIG. 2, arranged such that front end portions (front end portions of the lower horizontal portions 42a) are connected with each other by way of a frontwardly projected arcuate portion 42c as viewed in a plan view, that is, the left and right lower pipes 42 constitute the integral structural body.

As shown in FIG. 1, to a connecting portion between the upper inclined portion 41a and the rear inclined portion 41c of the upper pipe 41, front end portions of a pair of left and right rear upper pipes 43 which also function as seat rails are connected. The respective rear upper pipes 43 extend substantially horizontally in the rearward direction of the vehicle body, a cross member 50 extends between longitudinally intermediate portions of the rear upper pipes 43, and rear ends of the rear inclined portions 42b of the lower pipes 42 are joined to the cross member 50. Further, a rear sub pipe 44 is arranged between a vertical intermediate portion of the rear inclined portion 42b of the lower pipe 42 and the vicinity of a rear end portion of the rear upper pipe 43. The connection strength between the left and right rear upper pipes 43 and the lower pipes 45 is reinforced by the rear sub pipe 44 and the above-mentioned cross member 50 thus ensuring sufficient frame rigidity.

To the vicinities of the front end portions of the lower horizontal portion 42a of the lower pipes 42, the front lower pipes 45 are joined. The front lower pipes 45 extend to a front side of the vehicle body and front protectors 34 are connected to front end portions of the front lower pipes. The front protectors 34 also function as carrier pipes for supporting a front carrier 35. Further, step bars 56 are mounted on the lower horizontal portions 42a, and these step bars 56 and step boards 56a arranged below the step bars 56 (see FIG. 2) constitutes rider's steps.

Further, a pair of left and right front cushion pipes 46 is joined to front end portions of the front lower pipes 45. The front cushion pipe 46 extends toward an oblique rearward and upward direction while being bent in an approximately S shape, an upper end portion of the front cushion pipe 46 is connected to a front end portion of each upper pipe 41, and the front cushion pipe 46 and the front inclined portion 41b are connected with each other by means of a pair of left and right front sub pipes 47 which are inclined in the forward and upward direction.

Further, between the left and right front cushion pipes 46, cross members 51, 55 extend in a vertically spaced-apart manner, while also between left and right front pipes 45, cross members 53, 54 extend in the longitudinally spaced-apart manner. Further, also between the left and right front sub pipes 47, a cross member 52 extends. With the provision of these cross members 51 to 54, the frame rigidity around the front side can be sufficiently ensured and, at the same time, the cross members 52, 53 and 54 and the like also function as support members which support the final gear case 11.

These cross members 51 to 54 are formed in an approximately U-shape cross-sectional shape which opens downwardly. Among these cross members 51 to 54, front and rear proximal end sides of the pair of left and right upper arms (not shown in the drawing) are vertically pivotally and tiltably supported on both side portions of each one of the cross members 51, 52 which are positioned at an upper side, while front and rear proximal end sides of the pair of left and right lower arms (not shown in the drawing) are vertically pivotally and tiltably supported on both side portions of each one of the cross members 53, 54 which are positioned at a lower side. A pair of left and right knuckles (not shown in the drawing) is vertically pivotally and tiltably supported on distal end sides of both upper arms and lower arms, hub portions of left-and-right front wheels 2 are rotatably supported on both knuckles, and a pair of left and right front cushion units 58 is respectively interposed between the left and right lower arms and the cross member 55. A front suspension 57 is constituted of these parts.

Further, brackets 48, 49 are formed on the rear inclined portion 42b of the lower pipe 42 in a vertically spaced-apart manner, and a sub frame 60 is supported by way of these brackets 48, 49. The sub frame 60 is, in the same manner as the frame body 4a, formed by integrally joining a plurality of kinds of steel materials by welding.

To be more specific, the sub frame 60 forms the box structure which is connected to a rear portion of the frame body 4a at the vehicle-width center portion by joining a pair of left and right closed-loop structural bodies which are mainly formed of a pair of left and right sub lower pipes 61 which are connected with the brackets 49 and extend in the rear longitudinal direction of the vehicle body, a pair of left and right sub upper pipes 62 which extend rearwardly and upwardly from the vicinity of the front end portions of the respective sub lower pipes 61 and, thereafter, are bent and extend rearwardly substantially parallel to the sub lower pipes 61, a pair of left and right extension pipes 63 which extend frontwardly and upwardly from an rear portions of the sub upper pipes 62 and have front end portions thereof connected to brackets 48, and a pair of left and right rear members 64 which vertically connect the vicinities of rear end portions of the sub upper pipe 62 and the sub lower pipe 61 by way of a plurality of cross members. Further, the final gear case 12 is supported in the inside of a gap surrounded by the sub frame 60 and, on a front side of the final gear case 12, a brake caliper 17b which pushes a pad to a brake disc 17a coaxially fixed to the propeller shaft 9 for rear wheels 3 are supported.

A top cross member 66 extends between upper portions of the extension pipes 63, a front upper cross member 69 extends between intermediate portions of the sub upper pipes 62, and a front lower cross member 67 extends between intermediate portions of the sub lower pipes 61. Further, a rear lower cross member 68 extends between the vicinities of lower end portions of the rear members 64, and a center upper cross member 70 extends between lower portions of the extension pipes 63. These cross members 66 to 70 are formed in an approximately U-shaped cross-sectional shape which is opened downwardly. Due to such a constitution, it is possible to ensure the sufficient frame rigidity around the rear side.

Further, front and rear proximal end sides of the pair of left and right upper arms (not shown in the drawing) are pivotally and vertically tiltably supported on both side portions of the front upper cross member 69 and both upper portions of the rear members 64. Front and rear proximal end sides of the pair of left and right lower arms (not shown in the drawing) are pivotally and vertically tiltably supported on both lower portions of the front across member 67 and the rear members 64. The pair of left and right knuckles (not shown in the drawing) is pivotally and vertically tiltably supported on distal end sides of both upper arms and lower arms, hub portions of left and right rear wheels 3 are rotatably supported on both knuckles. Between the left and right lower arms and both side portions of the center upper cross member 70, a pair of left and right rear cushion units 79 is interposed. The rear suspension 75 is constituted of these parts.

Next, the seat 29 and the support structure which supports the seat 29 are explained.

Figure 3:
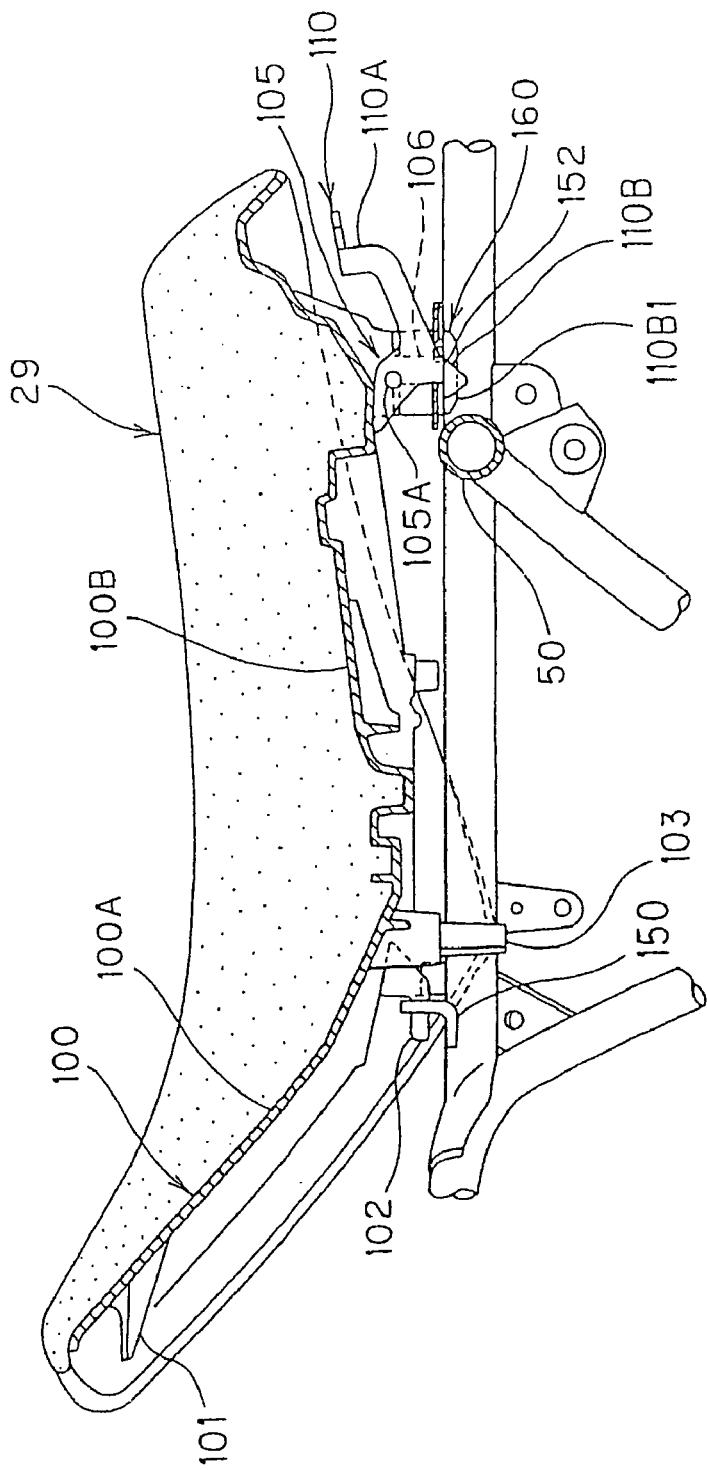
FIG. 3 is a cross-sectional side view of a seat together with the surrounding constitution.

The seat 29 includes, as shown in FIG. 3, a seat bottom plate 100 which functions as a seat frame. The seat bottom plate 100 is integrally formed of a front inclined portion 100A which is inclined rearwardly and downwardly along a tank cover (a portion of the vehicle body cover 32) which covers a fuel tank 28, and a rear extending portion 100B which is continuously connected to a rear end of the front inclined portion 100A and extends to a rear portion of the vehicle body along rear upper pipes 43 which also function as seat rails using a resin material.

Figure 4:
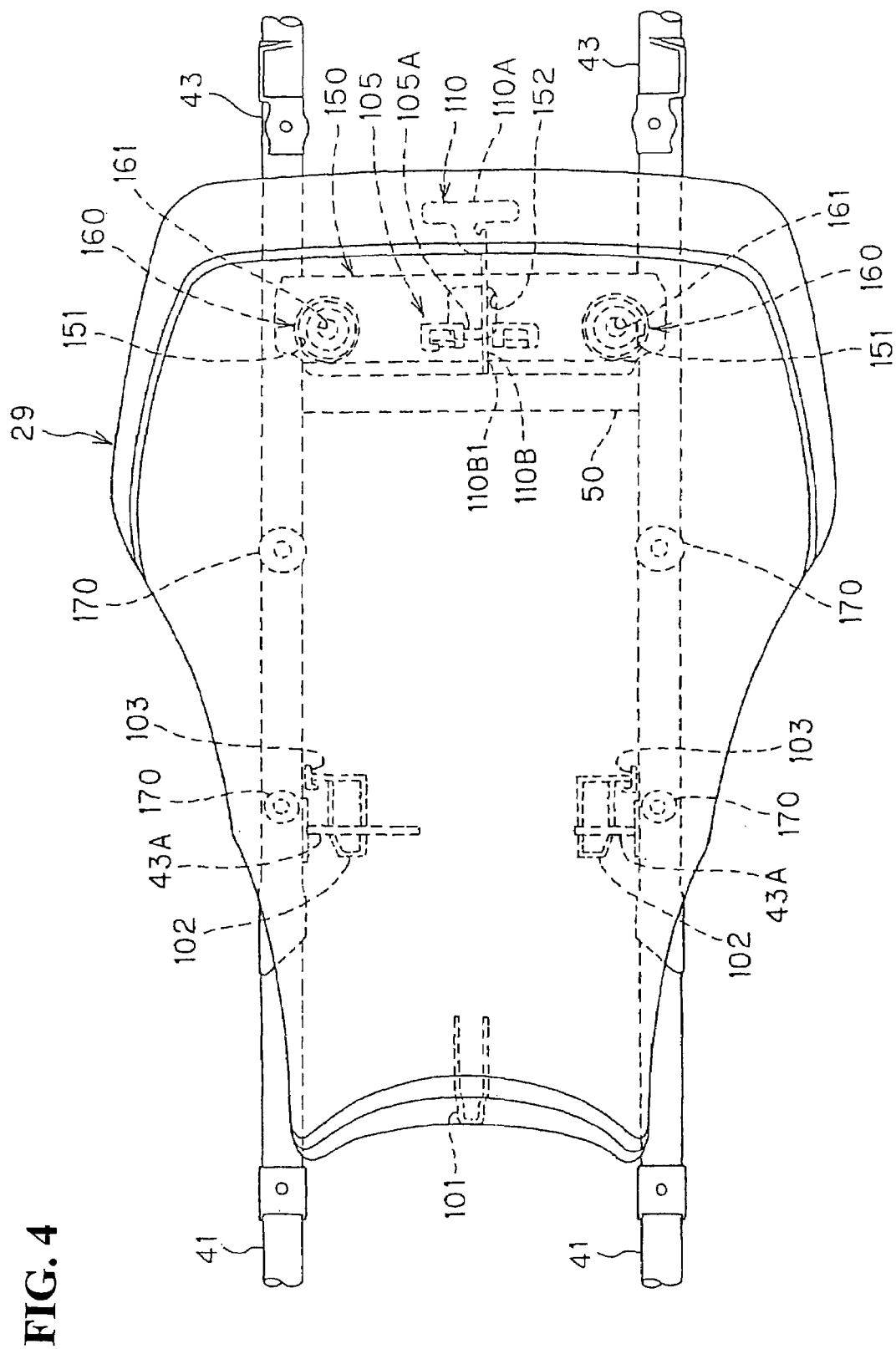
FIG. 4 is a top plan view of the seat together with the surrounding constitution.

A pawl portion 101 which projects toward the tank cover is formed on the front inclined portion 100A. The pawl portion 101 is engaged with a recessed portion not shown in the drawing formed in the tank cover when the seat 29 is mounted thus preventing the lifting of a front portion of the seat. On the rear extending portion 100B, as shown in FIG. 3 and FIG. 4, a pair of left and right positioning hooks 102 which extends downwardly from an approximately front portion of the rear extending portion 100B and, thereafter, is bent and extends toward the front and a pair of left and right positioning plates 103 which extends downwardly from a position in the vicinity of these hooks 102 are mounted. The positioning plates 103, in mounting the seat 29, firstly pass the inside of the respective rear upper pipes 43 and are arranged in the vicinity of inner surfaces of the respective rear upper pipes 43 thus functioning as guide members which guide a lateral mounting position of the seat 29 with respect to the rear upper pipes 43 and, at the same time, functioning as positioning members for preventing the lateral displacement of the seat 29.

Further, on a rear portion of the rear extending portion 100B, as shown in FIG. 3, a stopper support portion 105 which rotatably supports a stopper 110 and a pair of left and right guide pins (portions to be supported) 106 which project downwardly from left and right sides of the stopper support portion 105 are integrally formed.

The stopper 110 is integrally formed of a lever portion 110A which extends toward a rear portion of the seat from the support portion 105A which is supported on the stopper support portion 105, and an engaging portion 110B which extends downwardly from the support portion 105A and forms a pawl portion 110B1 on a lower end of the support portion 105A. The lever portion 110A is vertically tiltably supported using the support portion 105A as a fulcrum and, at the same time, the lever portion 110A is biased downwardly by a biasing member not shown in the drawing.

On the other hand, to front portion of the rear upper pipes 43, as shown in FIG. 4, a pair of left and right brackets 43A is joined by welding. Each bracket 43A includes an opening portion which is formed in the vehicle-body longitudinal direction and allows the above-mentioned positioning hook 102 of the seat 29 to be inserted therein and removed therefrom. In mounting the seat 29, the positioning hooks 102 of the seat are respectively inserted into the opening portions thus preventing the lifting of an intermediate portion of the seat 29.

Further, at a position in the vicinity of the cross member 50 at the intermediate portions of the rear upper pipes 43, a seat support plate 150 which also functions as a cross member of the rear upper pipes 43 extends between the rear upper pipes 43. The seat support plate 150 is formed of a plate-like member such as a metal plate. The seat support plate 150 extends substantially horizontally in the vehicle-body width direction and has both side portions joined to the respective rear upper pipes 43 by welding. Between the respective rear upper pipes 43, a pair of left and right opening portions 151 and a center opening portion 152 which penetrate vertically are formed in the seat support plate 150.

The center opening portion 152 is formed into an opening which allows the engaging portion 110B of the stopper 110 to be inserted therein or removed therefrom in a state that the lever portion 110A is lifted in mounting the seat 29. When the lever portion 110A is lowered due to a biasing force of the biasing member in a state that the engaging portion 110B is inserted into the center opening portion 152, the pawl portion 110B1 of the engaging portion 110B is engaged with the seat support plate 150 thus holding the seat 29 on the seat support plate 150. On the other hand, when a user (a driver or the like) lifts the lever portion 110A, the engagement between the pawl portion 110B1 and the seat support plate 150 is released and hence, the seat 29 can be removed.

Figure 5:
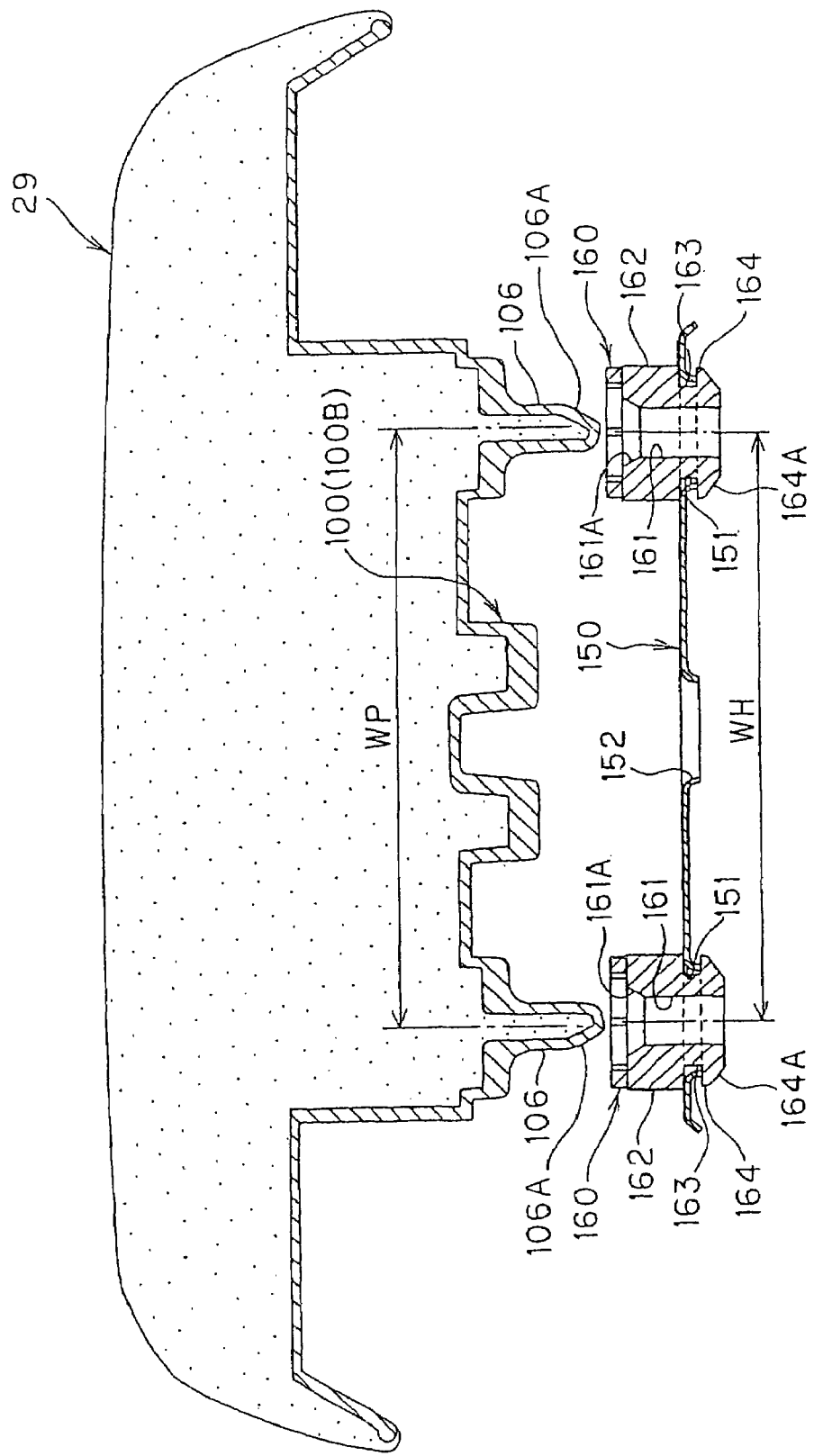
FIG. 5 is a transverse cross-sectional view showing the seat and the seat support structure when the seat is not mounted.
Figure 6:
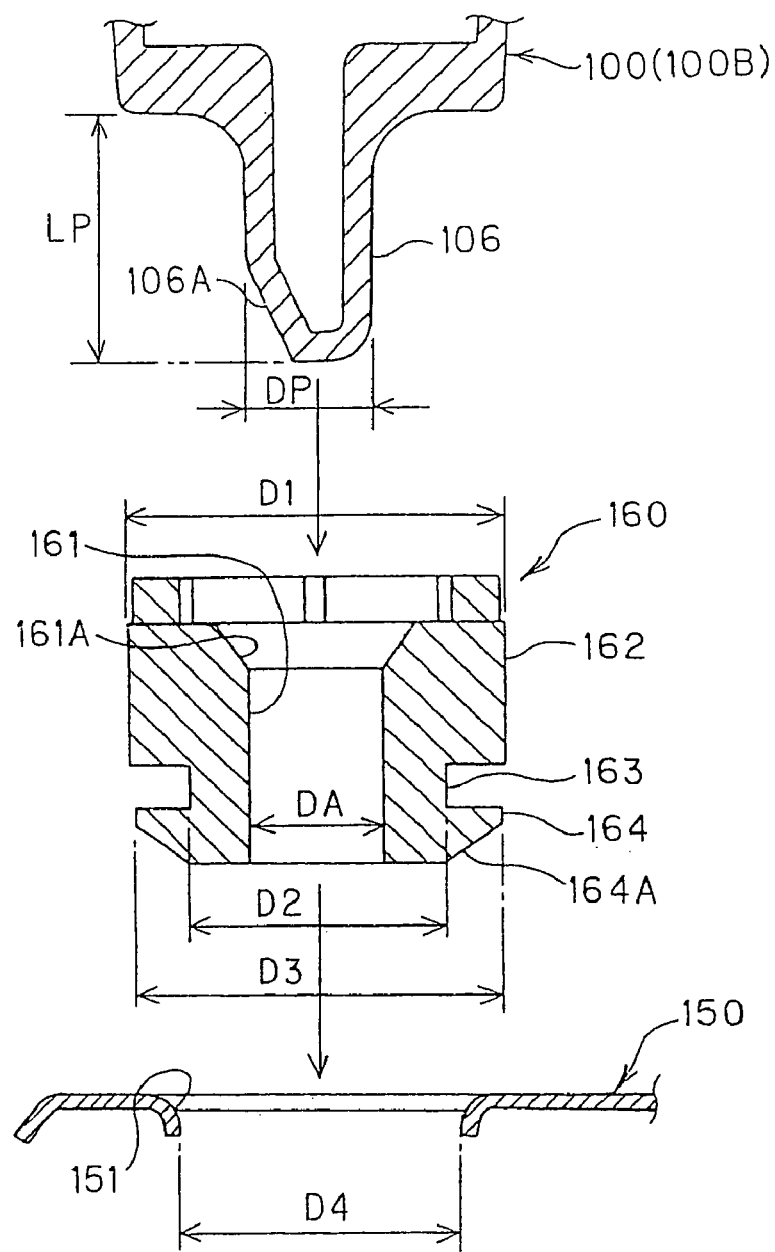
FIG. 6 is a cross-sectional view showing guide pins of the seat, mount rubbers and a seat support plate.

In the left and right opening portions 151 of the seat support plate 150, as shown in FIG. 5, cylindrical mount rubbers 160 which constitute seat support members are respectively arranged. The mount rubber 160 is configured by forming an annular groove in a cylindrical member made of a resilient material such as rubber, and is integrally formed of a through hole 161 which penetrates the mount rubber 160 in the vertical direction, a body portion 162, an engaging groove portion 163 in which an annular groove is formed, and an insertion portion 164 which is arranged on a more distal end side than the engaging groove portion 163.

An inner diameter DA of the through hole 161 is substantially equal to an outer diameter DP of the guide pin 106 mounted on the seat bottom plate 100. A tapered surface 161A is formed on an upper portion of the through hole 161, and the inner diameter DA of the through hole 161 is set larger than the diameter of the guide pin 106 thus facilitating the insertion of the guide pin 106. A length LP of the guide pin 106 is set to a length which prevents the guide pin 106 from penetrating the through hole 161 and, at the same time, the inclined portion 106A which is inclined obliquely and upwardly toward the outside of the vehicle body is formed on a distal end of the guide pin 106 and is tapered. Also due to such a constitution, the guide pin 106 can be easily inserted into the through hole 161.

An outer diameter D1 of the above-mentioned body portion 162 is set to a diameter equal to or more than an outer diameter D3 of the insertion portion 164 and also is set to a diameter equal to or more than an inner diameter D4 of the opening portion 151 of the seat support plate 150, an outer diameter D2 of the engaging groove portion 163 is set to a diameter less than the inner diameter D4 of the opening portion 151, and an outer diameter D3 of the insertion portion 164 is set to a diameter equal to or more than the inner diameter D4 of the opening portion 151. That is, a relationship of D1≧D3>D4>D2 is established. However, in this embodiment, the outer diameter D3 of the insertion portion 164 is set substantially equal to the inner diameter D4 of the opening portion 151 thus facilitating the insertion of the insertion portion 164 into the opening portion 151.

Further, an inclined portion 164A which is inclined obliquely and upwardly toward the outside of the vehicle is formed on a peripheral portion of a lower surface of the above-mentioned insertion portion 164. Due to such a constitution, a thickness of a peripheral portion of the insertion portion 164 of the mount rubber 160 can be reduced and hence, the insertion portion 164 is easily deflected in inserting the insertion portion 164 into the opening portion 151 of the seat support plate 150 thus facilitating the insertion of the inserting portion 164.

Due to the above-mentioned constitution, when the insertion portion 164 of the mount rubber 160 is inserted into the opening portion 151 of the seat support plate 150, a lower surface of the body portion 162 of the mount rubber 160 is brought into contact with an upper surface of the peripheral portion of the opening portion 151 and hence, the mount rubber 160 is supported on the seat support plate 150 in a state that the engaging groove portion 163 of the mount rubber 160 is positioned in the inside of the opening portion 151. In this case, the outer diameter D2 of the engaging groove portion 163 of the mount rubber 160 is set less than the inner diameter D4 of the opening portion 151 and hence, the mount rubber 160 is movable in the lateral direction of the vehicle body or the like within a range that the engaging groove portion 163 is movable in the inside of the opening portion 151.

Figure 7:
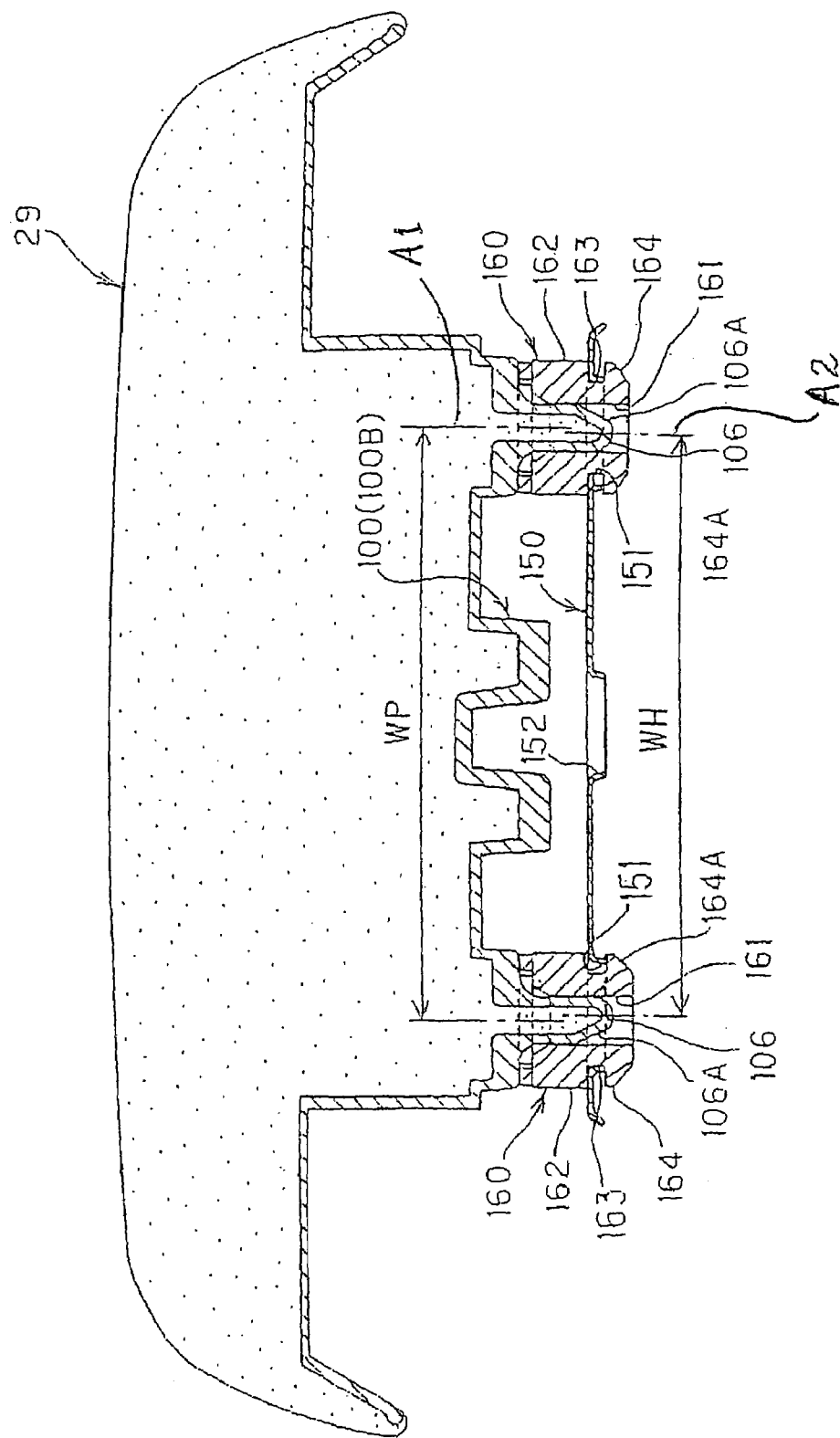
FIG. 7 is a transverse cross-sectional view showing the seat and the seat support structure when the seat is mounted.

In the above-mentioned constitution, as shown in FIG. 5, a distance WP between the left and right guide pins 106 of the seat bottom plate 100 is set to a value longer than a distance WH between the left and right opening portions 151 of the seat support plate 150. To be more specific, the distance WP between the guide pins 106 is, as shown in FIG. 7, set to a distance which agree with a distance between the through holes 161 formed in the respective mount rubbers 160 at positions where portions of groove walls of the engaging groove portions 163 of the respective mount rubbers 160 are brought into pressure contact with inner walls (opening walls) of the opening portions 151 directed toward the outside of the vehicle body.

Accordingly, in a state that the left and right guide pins 106 of the seat bottom plate 100 are inserted into the through holes 161 of the mount rubbers 160 (see FIG. 7), the portions of the groove walls of the engaging groove portions 163 of the mount rubbers 160 are moved to positions at which the portions of the groove walls of the engaging groove portions 163 of the respective mount rubbers 160 are respectively brought into pressure contact with the inner walls of the opening portions 151 directed toward the outside and hence, the movement of the seat 29 in the lateral direction of the vehicle body is restricted whereby the lateral mounting position of the seat 29 is fixed. In other words, in a state that the left and right guide pins 106 of the seat bottom plate 100 are inserted into the through holes 161 of the mount rubbers 160 (see FIG. 7), axial center lines A1 of the mount rubbers 160 are offset from axial center lines A2 of the opening portions 151.

In this saddle-type vehicle, an annular groove portion is formed in a mount rubber, and a distal portion of the mount rubber excluding the annular groove portion has a diameter larger than a diameter of an opening portion of a seat support portion. Accordingly, the insertion of the mount rubber requires a force and, at the same time, the diameter of the annular groove is equal to the diameter of the opening portion of the seat support portion and hence, the fitting of the annular groove portion also requires a force.

However, in this embodiment, the diameter of the insertion portion 164 of the mount rubber 160 closer to the distal end side than the engaging groove portion 163 is set substantially equal to the diameter of the opening portion 151 of the seat support plate 150 and, the diameter of the engaging groove portion 163 is set smaller than the diameter of the opening portion 151 and hence, the insertion portion 164 and the engaging groove portion 163 of the mount rubber 160 can be easily inserted into the opening portion 151. Further, in this embodiment, as mentioned above, at the time of mounting the seat, the portion of the groove wall of the engaging groove portion 163 of the mount rubber 160 is held at a position where the portion is brought into pressure contact with the inner wall of the opening portion 151 toward the outside of the vehicle and hence, the seat 29 can be supported without a play in the lateral direction of the vehicle.

Further, when the engaging groove portion 163 of the mount rubber 160 is brought into pressure contact with the inner wall of the opening portion 151 toward the outside of the vehicle, as shown in FIG. 7, the body portion 162 and the insertion portion 164 of the mount rubber 160 are shifted toward the outside of the vehicle with respect to the opening portion 151. According to this embodiment, even in such a case, the body portion 162 and the insertion portion 164 are respectively positioned above and below an outer peripheral portion toward the inside of the vehicle astride the opening portion 151. Due to such a constitution, the body portion 162 and the insertion portion 164 of the mount rubber 160 are held in a state that the body portion 162 and the insertion portion 164 sandwich the seat support plate 150 therebetween and hence, the seat 29 can be supported more reliably and, at the same time, the removal of the mount rubber 160 can be prevented.

Further, as shown in FIG. 4, a plurality of rubber-made rubbers 170 are mounted on the seat bottom plate 100 at an interval. In mounting the seat, each rubber 170 is sandwiched between the seat 29 and the rear upper pipe 43 and an impact and vibrations which are transmitted to the seat 29 from the vehicle body frame 4 can be alleviated by these rubbers 170 and the mount rubbers 160.

In this embodiment, the seat bottom plate 100 forms the pawl portion 101 on the front portion thereof, the pair of left and right positioning hooks 102 and the positioning plate 103 on the intermediate portion thereof, and the pair of left and right guide pins 106 and the stopper 110 on the rear portion thereof. In mounting the seat 29, the pawl portion 101 is engaged with the tank cover (a portion of the vehicle body cover 32), the positioning hooks 102 are engaged with brackets 43A of the rear upper pipes 43, the guide pin 106 is engaged with the seat support plate 150 by the stopper 110 in a state that the guide pin 106 is supported on the mount rubbers 160, and the left and right positioning plates 103 are arranged in the vicinity of the inner surfaces of the respective rear upper pipes 43.

Due to such a constitution, the vertical mounting position of the seat 29 is fixed by the above-mentioned pawl portion 101, positioning hooks 102, mount rubbers 160, 170 and stopper 110 and hence, the lifting or the like of the seat 29 can be surely prevented and, at the same time, the vertical vibrations or the like between the vehicle body frame 4 and the seat 29 can be alleviated by the mount rubbers 160 and the rubber 170.

Further, the guide pin 106 is inserted into the mount rubber 160 at a position where the mount rubber 160 is brought into pressure contact with the vehicle-body-outside-side inner wall of the opening portion 151 of the seat support plate 150 and hence, the guide pin 160 is held by the mount rubber 160 and, at the same time, the above-mentioned positioning plate 103 is positioned in the vicinity of the inner surface of each rear upper pipe 43 thus preventing the lateral displacement of the seat 29 whereby the lateral displacement of the seat 29 can be surely prevented and the lateral vibrations between the vehicle body frame 4 and the seat 29 can be alleviated by the mount rubbers 160.

As has been explained above, according to the above-mentioned constitution, at the seat mounting position at which the insertion portion 164 of the mount rubber 160 arranged closer to the distal end side than the engaging groove portion 163 is inserted into the opening portion 151 of the seat support portion 150 and the guide pin 106 of the seat 29 is inserted into the through hole 161 formed in the mount rubber 160, the mount rubber 160 is moved in the radial direction in the inside of the opening portion 151 and the portion of the groove wall of the engaging groove portion 163 is brought into pressure contact with the opening wall of the opening portion 151. Accordingly, even when there exists an error in manufacturing between positions of the pair of left and right guide pins 106 of the seat 29 and the position of the pair of left and right mount rubbers 160, the seat 29 can be assembled to the mount rubbers 160 and hence, the seat mounting operation can be easily performed. Further, at the seat mounting position, the mount rubber 160 is brought into pressure contact with the opening portion 151 thus supporting the seat 29 without a play.

Further, the diameter of the insertion portion 164 of the mount rubber 160 closer to the distal end side than the engaging groove portion 163 is set substantially equal to the diameter of the opening portion 151 of the seat support plate 150 and hence, the mount rubber 160 can be easily inserted into the opening portion 151 thus facilitating the assembling operation of the mount rubber 160.

Further, the diameter of the engaging groove portion 163 of the mount rubber 160 is set smaller than the diameter of the opening portion 151 of the seat support portion 150 and hence, it is possible to ensure a wide degree of freedom in movement of the mount rubber 160 in the inside of the opening portion 151 whereby the assembling operation of the mount rubber can be further facilitated.

Further, the diameter of the body portion 162 of the mount rubber 160 is set larger than the diameter of the insertion portion 164 and hence, when the mount rubber 160 is inserted into the opening portion 151, the body portion 162 is supported on the seat support portion 150 without passing the opening portion 151 whereby the removal of the mount rubber 160 can be surely prevented.

Further, the diameter of the insertion portion 164 of the mount rubber 160 is set slightly larger than the diameter of the opening portion 151 of the seat support portion 150 and the diameter of the engaging groove portion 163 is set smaller than the diameter of the opening portion 151 of the seat support plate 150 and hence, in assembling the mount rubber 160, the mount rubber 160 can be easily inserted into the opening portion 151 while making the removal of the mount rubber 160 from the opening portion 151 difficult.

Further, the guide pin 106 of the seat 29 forms the inclined portion 106A obliquely and upwardly on the vehicle-body-outer-side thereof and hence, the guide pin 106 can be easily inserted into the through hole 161 formed in the mount rubber 160. At the same time, along with the continued insertion of the guide pin 106, the inclined portion 106A is brought into contact with the vehicle-body-outer-side of the through hole 161 formed in the mount rubber 160 so as to move the mount rubber 160 on the vehicle-body-outer-side to the position (corresponding to the seat mounting position) at which the portion of the groove wall of the engaging groove portion 163 is brought into pressure contact with the vehicle-body-outer-side opening wall of the opening portion 151 and hence, the seat mounting operation is facilitated.

Further, the length of the guide pin 106 is set such that the guide pin 106 does not penetrate the mount rubber 160 and hence, compared to the conventional structure which allows the guide pin to penetrate the mount rubber, it is possible to easily insert the guide pin 106 deeply. Further, the guide pin 106 is positioned in the inside of the body portion 162 of the mount rubber 160 (see FIG. 7) and hence, when the seat 29 receives a weight and is slid in either left or right direction of the vehicle body, the mount rubber 160 can receive the weight due to the deflection of body portion 162 of the mount rubber 160.

Further, in mounting the seat 29, the pair of left and right positioning plates 103 which extend to the vicinity of the inner surfaces of the respective rear upper pipes 43 is formed on the seat bottom plate 100 and hence, the lateral displacement of the seat 29 can be prevented also by these positioning plates 103. Further, the positioning plates 103 extend downwardly from the seat bottom plate 100 and hence, in mounting the seat 29, the positioning plates 103 firstly pass the inside of the respective rear upper pipes 43 and hence, the seat 29 can be surely guided to the mounting position. Further, in removing the seat 29, the positioning plate 103 and the stopper support portion 105 are used as legs of the seat 29 thus enabling the self-standing of the seat 29 thus preventing flaws or the like on a surface skin of the seat which occur when the seat 29 is placed as a single body. Here, the positioning plates 103 may not be limited to the pair of left and right positioning plates 103. For example, for positioning the seat 29, a cross member may be provided to the vehicle body frame 4, a receiving portion which receives the positioning plate is formed on the cross member, and the positioning plate which constitutes a single body is received by the receiving portion. The number of the positioning plates may be single or a plural number.

Although the invention has bee explained based on one embodiment, it is apparent that the invention is not limited to such an embodiment. For example, in the above-mentioned embodiment, the explanation has been made with respect to the example in which at the seat mounting position where the guide pins 106 of the seat 29 are inserted into the through holes 161 formed in the mount rubbers 160, the engaging groove portions 163 of the mount rubbers 160 are brought into pressure contact with the vehicle-body-outside opening walls of the opening portions 151. However, the invention is not limited to such a case.

Figure 8:
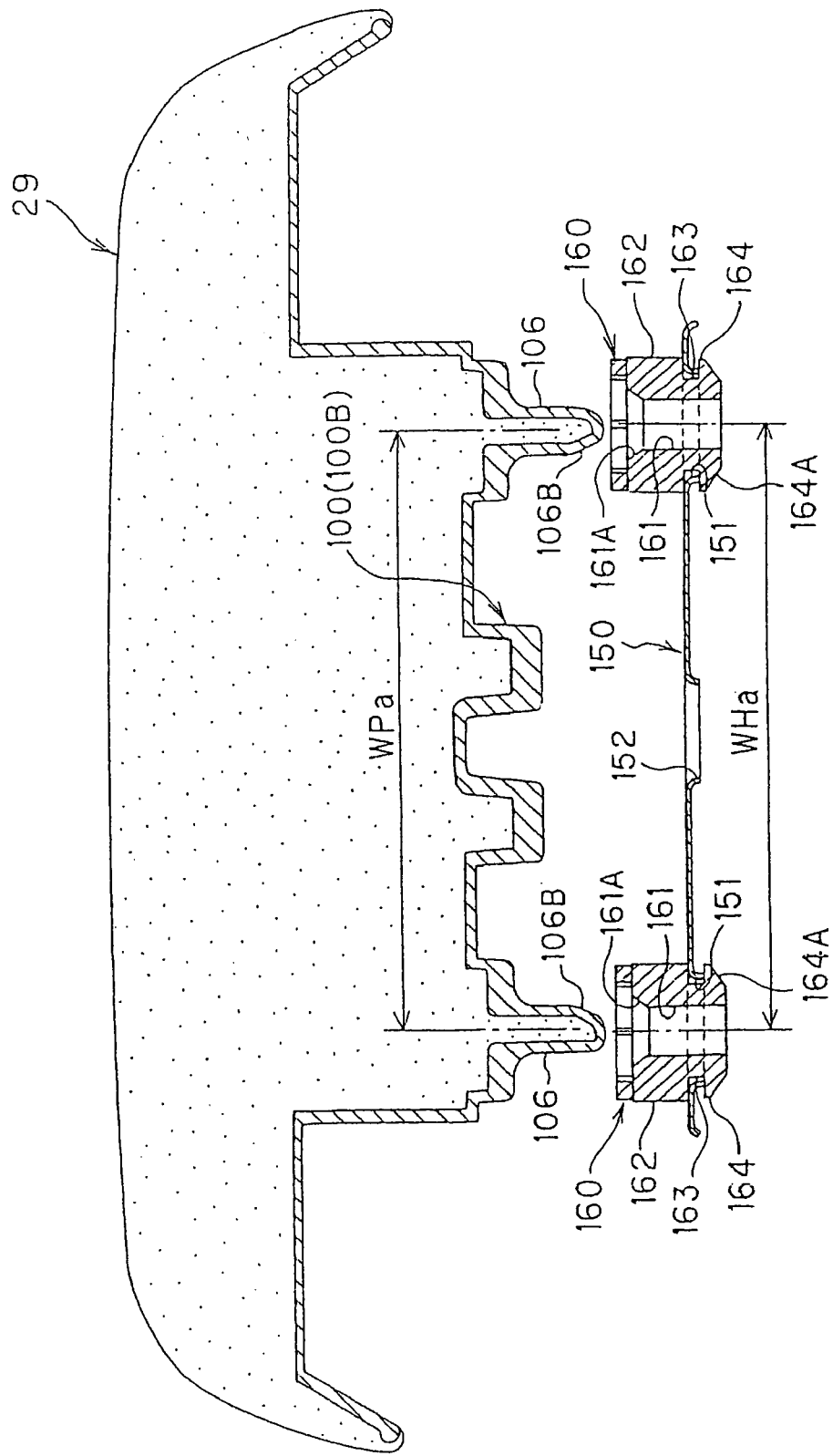
FIG. 8 is a transverse cross-sectional view showing the seat and the seat support structure of a modification when the seat is not mounted.
Figure 9:
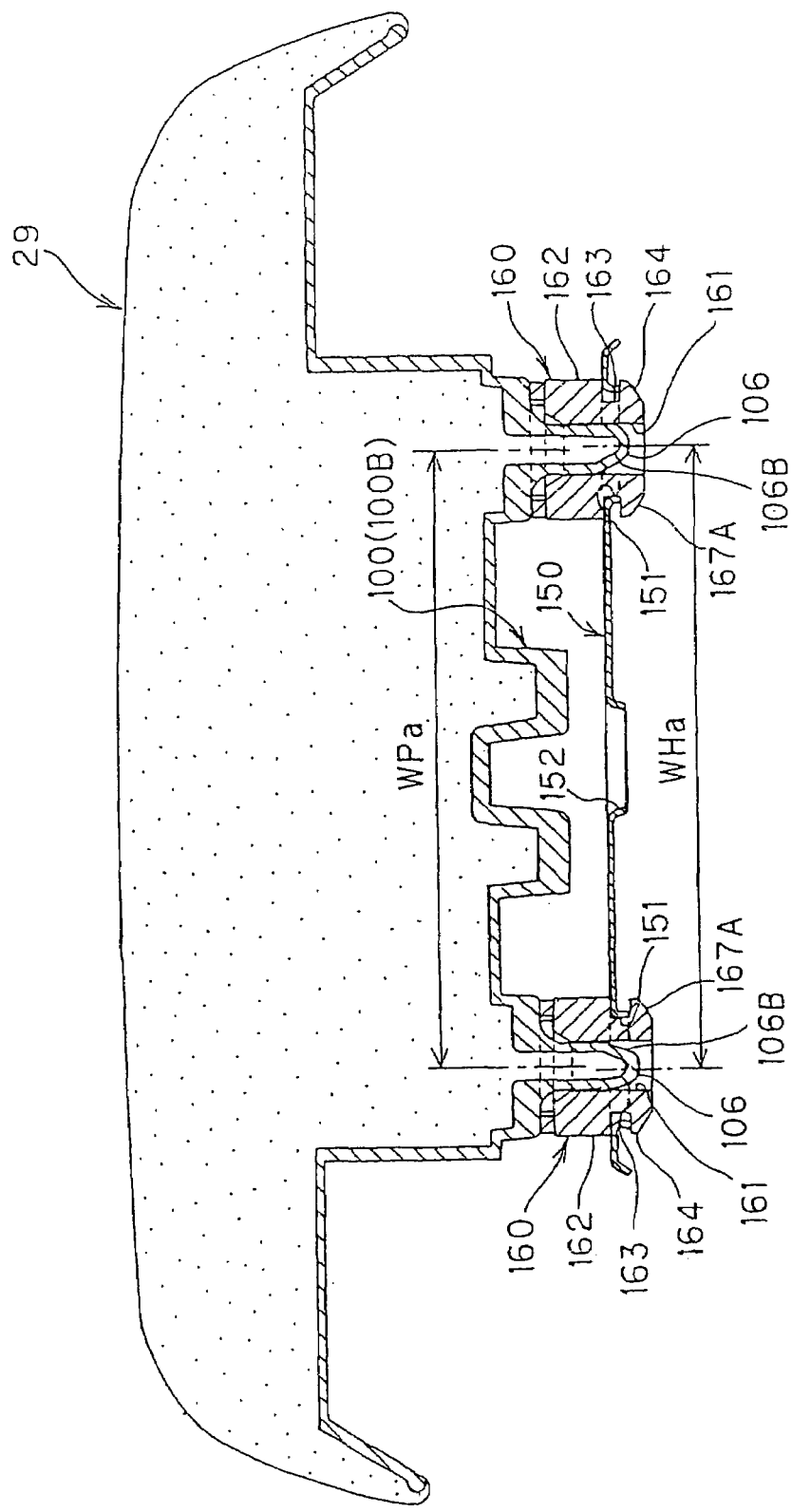
FIG. 9 is a transverse cross-sectional view showing the seat and the seat support structure of a modification when the seat is mounted.

For example, as shown in FIG. 8, a distance WPa between the left and right guides pins 106 of the seat bottom plate 100 may be set shorter than a distance WHa between the left and right opening portions 151 of the seat support plate 150. To be more specific, as shown in FIG. 9, the distance WPa between the left and right guides pins 106 may be set to a distance equal to a distance between the through holes 161 of the respective mount rubbers 160 at the position where the portions of the groove walls of the engaging groove portions 163 of the respective mount rubbers 160 are brought into pressure contact with the vehicle-body-inside inner walls (opening walls) of the opening portions 151.

In this case, the inclined portion 106B which is inclined obliquely and upwardly is formed on the vehicle-body-inner-side of the distal end portion of the guide pin 106. Accordingly, when the guide pins 106 of the seat 29 are inserted into the through holes 161 formed in the mount rubbers 160, the inclined portions 106A are brought into contact with the vehicle-body inside of the through holes 161 formed in the mount rubbers 160 and moves the mount rubbers 160 toward the inside of the vehicle body and hence, it is possible to move the mount rubber 160 to the position (corresponding to the seat mounting position) where the portions of the groove walls of the engaging groove portions 163 are brought into pressure contact with the vehicle-body-inside opening walls of the opening portions 151. Also in this case, even when the seat 29 receives a weight and is slid in either left or right direction of the vehicle body, both mount rubbers 160 whose movement in the slide direction is restricted do not move in the slide direction and hence, the seat 29 can be supported without a play in the lateral direction of the vehicle and, at the same time, the above-mentioned weight is received by the deflection of the body portions 162 of the mount rubbers 160.

Further, in the above-mentioned embodiment, the explanation has been made with respect to the case in which the diameter of insertion portion 164 of the mount rubber 160 closer to the distal end side than the engaging groove portion 163 is set substantially equal to the diameter of the opening portions 151 of the seat support plate 150 (including a case in which the diameter of insertion portion 164 is set slightly larger than the diameter of the opening portions 151), the invention is not limited to such a case and the diameter of the above-mentioned insertion portion 164 may be set smaller than the diameter of the above-mentioned opening portion 151.

The diameter of the insertion portion 164 of the mount rubber 160 may be set larger than at least the diameter of the opening portions 151. This is because that when the seat 29 is removed from the seat mounting state in which the portions of the groove walls of the engaging groove portions 163 of the mount rubbers 160 are brought into contact with the vehicle-body-inside opening walls of the opening portions 151, the insertion portions 164 having the diameter larger than the diameter of the engaging groove portions 163 are caught by the seat support plate 150 and hence, the upward removal of the insertion portions 164 is prevented whereby it is surely possible to prevent a possibility that the mount rubber 160 is removed together with the guide pins 106 of the seat 29.

Further, in the above-mentioned embodiment, the case in which the pair of left and right guide pins 106 are formed on the seat 29 and the pair of left and right opening portions 151 are formed in the seat support plate 150 has been illustrated. However, the invention is not limited to such a case, and a plurality of pairs of guide pins 106 and a plurality of pairs of opening portions 151 which respectively correspond to the plurality of pairs of guide pins 106 may be formed. In this case, the guide pins 106 and the opening portions 151 which respectively form pairs may be formed at intervals in the longitudinal direction, in the lateral direction or in the oblique direction, the interval between the guide pins 106 which constitute the pair and the interval between the opening portions 151 which constitute the pair are made different from each other, and the mount rubbers 160 are moved to the interval of the guide pins 106 so as to set the interval between the guide pins 106 equal to the interval of the through holes 161 formed in the mount rubbers 160 in a state that the portion of the engaging groove portion 163 is brought into pressure contact with the opening portion 151.

For example, by setting the interval of the guide pins 106 which constitute the pair longer than the interval of the opening portions 151 which constitute the pair thus moving the mount rubbers 160 respectively arranged in the opening portions 151 which constitute the pair in the direction away from each other, the interval of the guide pins 106 can be set equal to the interval of the through holes 161 formed in the mount rubbers 160 in a state that the portion of the engaging groove portion 163 is brought into pressure contact with the opening portion 151 and hence, the seat 29 can be surely supported and, at the same time, the seat mounting operation and the mount rubber assembling operation can be facilitated.

Further, although the explanation has been made with respect to the case in which the invention is applied to the four-wheeled saddle-type vehicle, the invention is not limited to such a case and the invention is widely applicable to the seat support structure of various vehicles including three-wheeled saddle-type vehicle. Such variations are not to be regarded as a departure from the spirit and scope of the invention, and all such modifications as would be obvious to one skilled in the art are intended to be included within the scope of the following claims.

What is claimed is:

1. A seat support structure which supports a seat by engaging an engaging groove portion formed on an outer peripheral portion of a mount rubber in an opening portion of a seat support portion of a vehicle and by inserting a portion of the seat to be supported into a through hole formed in a mount rubber, wherein
at a seat mounting position where an insertion portion of the mount rubber arranged closer to a distal end side than the engaging groove portion is inserted into the opening portion of the seat support portion and the portion of the seat to be supported is inserted into the through hole formed in the mount rubber, the mount rubber is moved in a radial direction in an inside of the opening portion, so that an axial center line of the mount rubber is offset from an axial center line of the opening portion, and a portion of a groove wall of the engaging groove portion is brought into pressure contact with the opening portion,
wherein a diameter of the engaging groove portion is set smaller than a diameter of the opening portion of the seat support portion.

2. The seat support structure according to claim 1, wherein a diameter of a body portion of the mount rubber is set larger than a diameter of the insertion portion.

3. The seat support structure according to claim 1, wherein a diameter of the insertion portion of the mount rubber is set larger than a diameter of the opening portion of the seat support portion.

4. The seat support structure according to claim 1, wherein the portion of the seat to be supported is a pin which projects from a seat bottom plate.

5. The seat support structure according to claim 4, wherein the pin forms an inclined portion on either one of a vehicle-body-outer-side or a vehicle-body-inner-side thereof.

6. The seat support structure according to claim 4, wherein a distal end of the pin does not penetrate the through hole formed in the mount rubber.

7. The seat support structure according to claim 1, wherein the seat includes:
   a seat bottom plate; and
   a positioning member which extends in a direction that is substantially parallel to an axis of the portion to be inserted in the through hole, the positioning member extending from a part of the seat bottom plate that is closer to a forward end of the seat than where the portion is disposed.

8. The seat support structure according to claim 1, wherein the seat includes a seat bottom plate having a pawl portion extending substantially horizontally from a front portion thereof, the pawl portion being adapted to be engaged with a tank cover.

9. The seat support structure according to claim 1, wherein a tapered surface is formed on an upper portion of each of the through holes, and an inner diameter of the through hole is set larger than a diameter of the portion of the seat, thus facilitating the insertion of the portion into the through hole.

10. A seat support structure which supports a seat by engaging an engaging groove portion formed on an outer peripheral portion of a mount rubber in an opening portion of a seat support portion of a vehicle and by inserting a portion of the seat to be supported into a through hole formed in a mount rubber, wherein
    at a seat mounting position where an insertion portion of the mount rubber arranged closer to a distal end side than the engaging groove portion is inserted into the opening portion of the seat support portion and the portion of the seat to be supported is inserted into the through hole formed in the mount rubber, the mount rubber is moved in a radial direction in an inside of the opening portion, and a portion of a groove wall of the engaging groove portion is brought into pressure contact with the opening portion,
    wherein a diameter of the engaging groove portion is set smaller than a diameter of the opening portion of the seat support portion,
    wherein the portion of the seat to be supported includes portions in pairs are arranged on the seat in a spaced-apart manner,
    the opening portion including opening portions in the same number of pairs as the portions to be supported arranged on the seat support portion in a spaced-apart manner, and
    the mount rubber includes mount rubbers in pairs in the same number of pairs as the opening portions,
    wherein a distance (WP, WPa) between the portions to be supported in pairs is made different from a distance (WH, WHa) between the opening portions in pairs, and the mount rubbers are formed with a distance equal to the distance between the respective through holes formed in the mount rubbers in a state that the mount rubbers are moved to the distance (WP, WPa) between the portions to be supported and portions of the engaging groove portions are brought into pressure contact with the opening portions respectively.

11. A seat support structure for supporting a seat with a portion to be supported, the seat support structure comprising:
    a seat support portion of a vehicle, the seat support portion having a circular opening portion;
    a mount rubber having an circular engaging groove portion formed on an outer peripheral portion thereof, an insertion portion arranged closer to a distal end side than the engaging groove portion, and a through hole penetrating from top to bottom of the mount rubber;
    wherein at a mounting position of the seat,
    the insertion portion of the mount rubber is inserted into the opening portion of the seat support portion,
    the portion of the seat to be supported is inserted into the through hole formed in the mount rubber, and
    the mount rubber is moved in a radial direction in an inside of the opening portion, so that an axial center line of the mount rubber is offset from an axial center line of the opening portion, and a portion of a circular groove wall of the engaging groove portion is brought into pressure contact with the opening portion,
    wherein a diameter of the engaging groove portion is set smaller than a diameter of the opening portion of the seat support portion.

12. The seat support structure according to claim 11, wherein a diameter of a body portion of the mount rubber is set larger than a diameter of the insertion portion.

13. The seat support structure according to claim 11, wherein a diameter of the insertion portion of the mount rubber is set larger than a diameter of the opening portion of the seat support portion.

14. The seat support structure according to claim 11, wherein the portion of the seat to be supported is a pin which projects from a seat bottom plate.

15. The seat support structure according to claim 14, wherein the pin forms an inclined portion on either one of a vehicle-body-outer-side or a vehicle-body-inner-side thereof.

16. The seat support structure according to claim 14, wherein a distal end of the pin does not penetrate the through hole formed in the mount rubber.

17. The seat support structure according to claim 11, wherein the seat includes:
    a seat bottom plate; and
    a positioning member which extends in a direction that is substantially parallel to an axis of the portion inserted in the through hole, the positioning member extending from a part of the seat bottom plate that is closer to a forward end of the seat than where the portion is disposed.

18. The seat support structure according to claim 11, wherein the seat includes a seat bottom plate having a pawl portion extending substantially horizontally from a forward portion thereof, the pawl portion being adapted to be engaged with a tank cover.

19. The seat support structure according to claim 11, wherein the portion of the seat to be supported includes portions in pairs are arranged on the seat in a spaced-apart manner,
    the opening portion including opening portions in the same number of pairs as the portions to be supported arranged on the seat support portion in a spaced-apart manner, and
    the mount rubber includes mount rubbers in pairs in the same number of pairs as the opening portions,
    wherein a distance (WP, WPa) between the portions to be supported in pairs is made different from a distance (WH, WHa) between the opening portions in pairs, and the mount rubbers are formed with a distance equal to the distance between the respective through holes formed in the mount rubbers in a state that the mount rubbers are moved to the distance (WP, WPa) between the portions to be supported and portions of the engaging groove portions are brought into pressure contact with the opening portions respectively.

20. The seat support structure according to claim 11, wherein a tapered surface is formed on an upper portion of the through holes, and an inner diameter of the through hole is set larger than a diameter of the portion of the seat, thus facilitating the insertion of the portion into the through hole.

* * * * *